Feb. 15, 1955  V. A. ZUGEL ET AL  2,702,189

SHEET PACK INSPECTION MEANS

Filed July 31, 1952  3 Sheets-Sheet 1

INVENTORS
VICTOR A. ZUGEL
BY CARL H. HEIGL

ATTORNEYS

INVENTORS
VICTOR A. ZUGEL
BY CARL H. HEIGL
Hudson, Broughton,
Williams, David & Hoffmann
ATTORNEYS

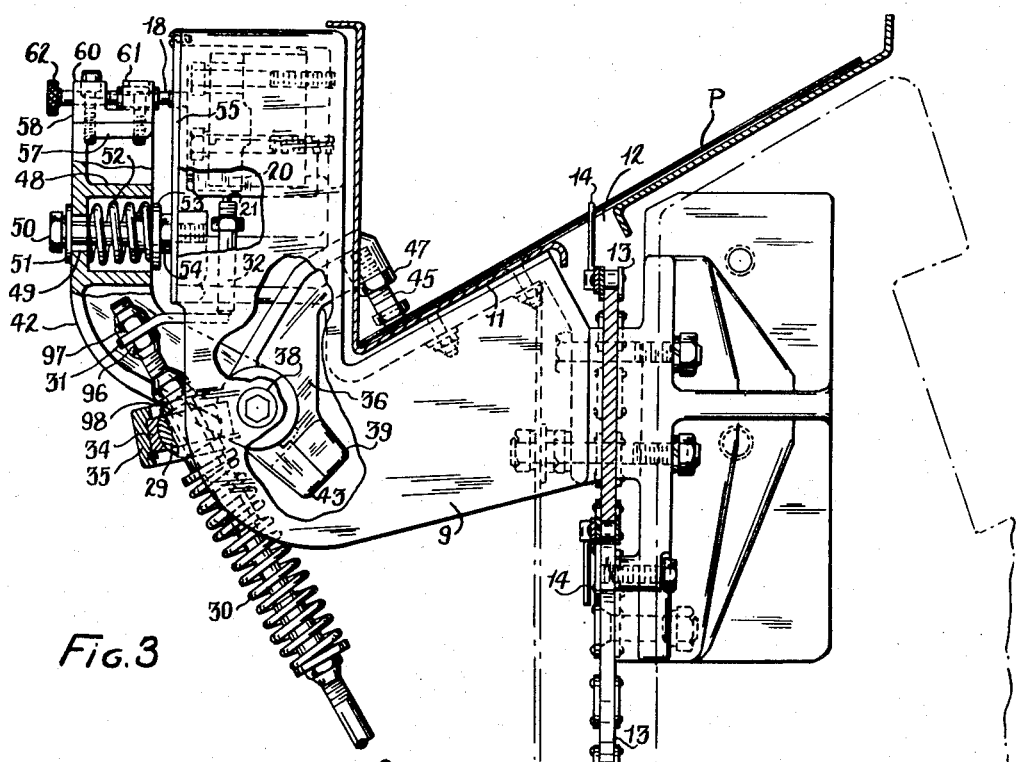
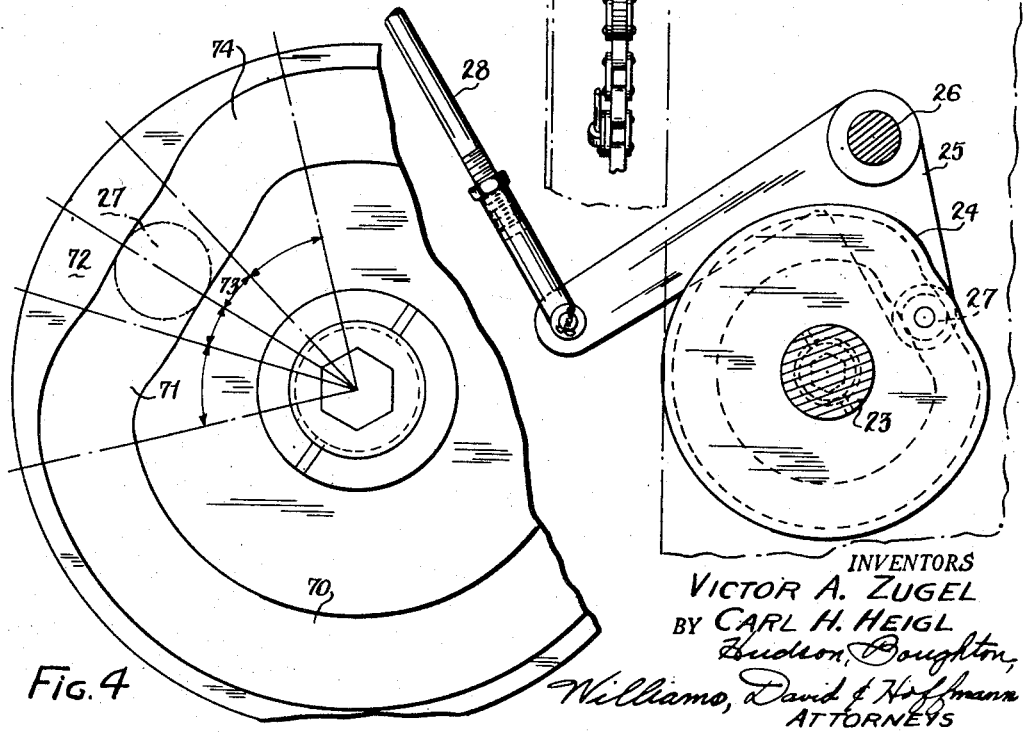

United States Patent Office 2,702,189
Patented Feb. 15, 1955

2,702,189

SHEET PACK INSPECTION MEANS

Victor A. Zugel, Euclid, and Carl H. Heigl, Cleveland, Ohio, assignors, by mesne assignments, to Macey Company, a corporation of Ohio Application July 31, 1952, Serial No. 302,021

12 Claims. (Cl. 270—58)

This invention relates to improvements in sheet pack inspection means, more specifically means for testing the thickness of an article or material, such as a pack of sheets, and functioning automatically when the material to be measured is of a thickness greater or less than the correct thickness for energizing a signal or stopping the machine upon which the inspection means is used, or both. The invention is illustrated herein as employed for testing the thickness of a completed pack of sheets at the delivery end of a sheet collating machine.

It is an object of the invention to provide a mechanism of extreme sensitiveness such as one capable of functioning on very thin paper stock when there is one sheet less than or one sheet more than a predetermined correct number in a pack of sheets.

Another object is the provision in a machine of the character stated of a pair of sensitive switches the actuating abutments for which move to different operating positions dependent upon whether the material to be measured is of correct thickness or too thick or too thin, with control means that require both switches to be closed at the testing moment if the machine is to continue running or if no signal is to be given.

Another object is the provision of means for oscillating a feeler that measures the thickness in such manner that bouncing is avoided and consequent interference with the smooth operation of the control is eliminated.

Still another object is the provision of an oscillating arm carrying the measuring feeler and an oscillating arm carrying the switch operating abutments, said latter arm being driven from said first arm during its final movement only, whereby the operating abutment movement may be of very small extent.

Other objects and features of novelty will appear as we proceed with the description of that embodiment of the invention which, for the purposes of the present application, we have illustrated in the accompanying drawings, in which:

Fig. 3 is an elevational view taken substantially along the line 3—3 of Fig. 2 with parts in section and parts broken away to more fully illustrate the invention;

Fig. 4 is a fragmental detail view on a larger scale of the cam for oscillating the feeler and associated parts;

Figure 1:
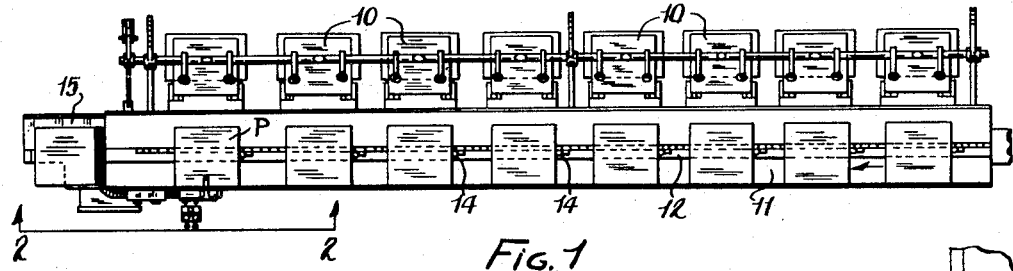
Fig. 1 is a plan view in diagrammatic form of a sheet collator in connection with which the invention may be used.
Figures 5, 6:
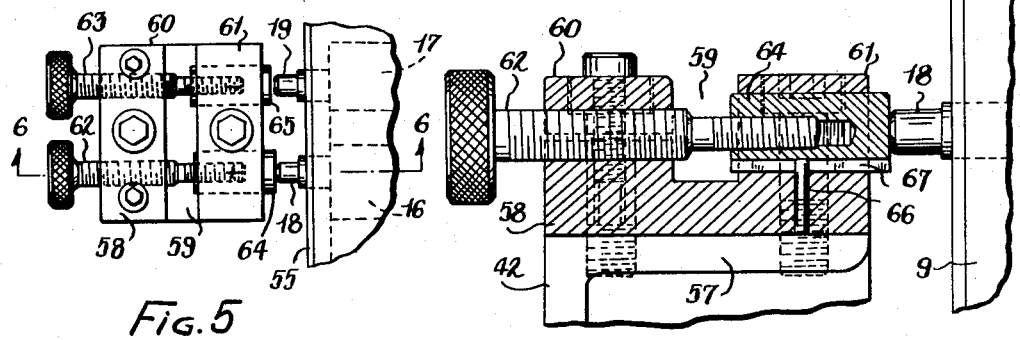
Fig. 5 is a plan view of two associated adjustable switch operating abutments and the switch plungers operated thereby.
Fig. 6 is a vertical sectional view on a larger scale, the view being taken substantially on the line 6—6 of Fig. 5.
Figure 12:
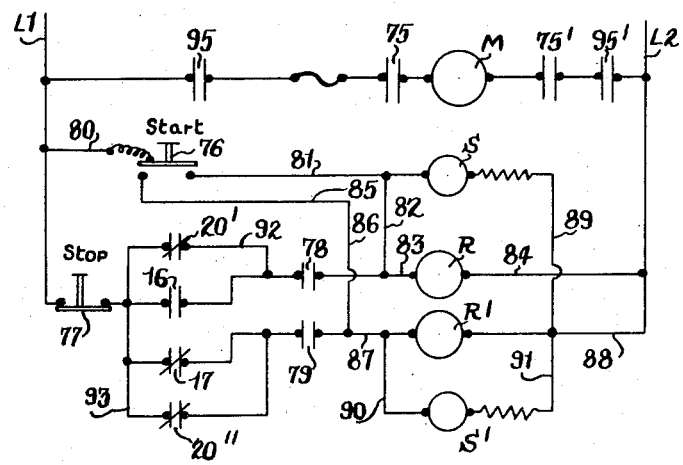
Fig. 12 is a wiring diagram of the motor circuit and the control circuits therefor.
Figure 2:
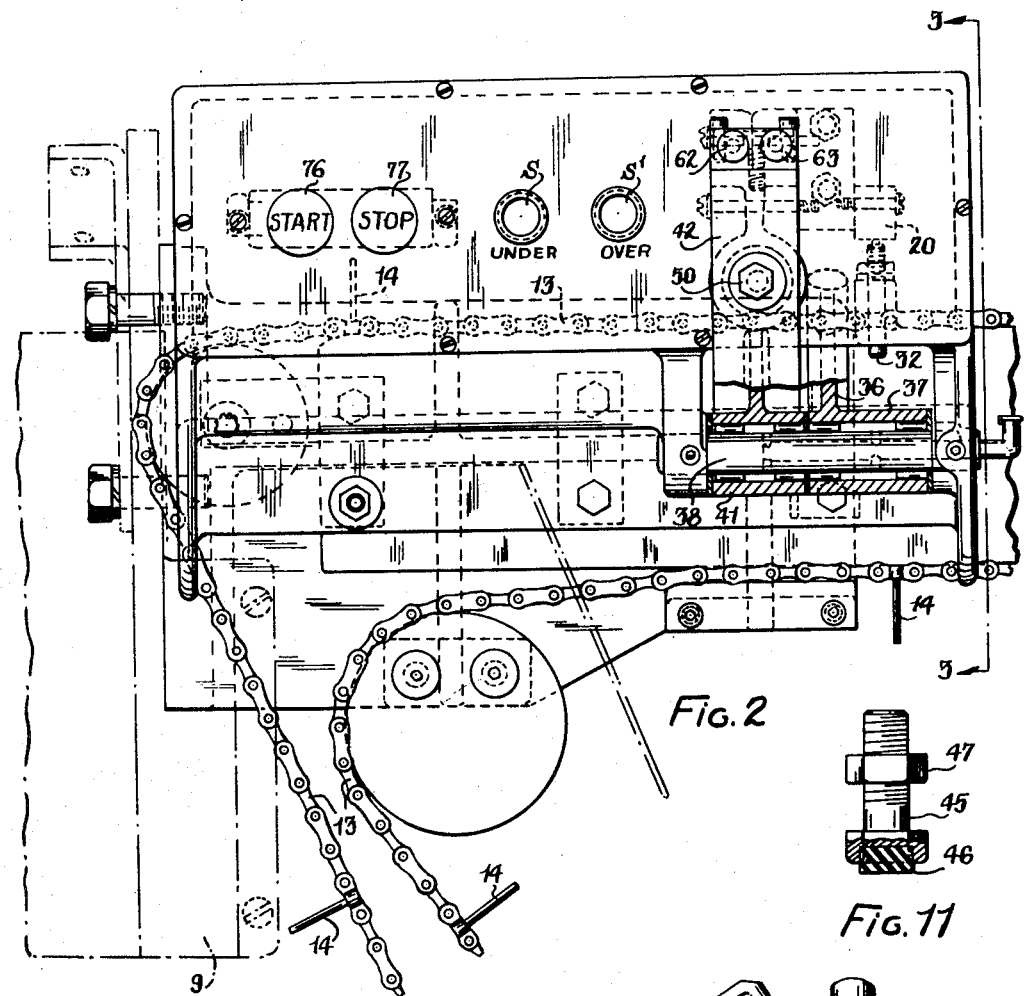
Fig. 2 is an elevational view, partly in vertical section and on a larger scale, of the delivery end of the collator looking in the direction of line 2—2 of Fig. 1 and showing the invention applied thereto.
Figures 9, 10, 11:
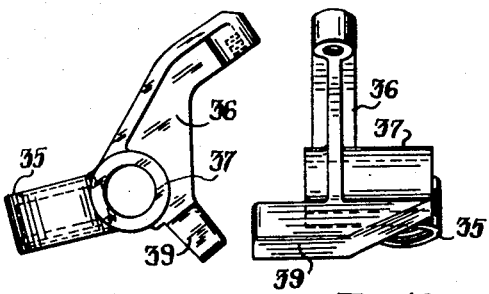
Figs. 9 and 10 are similar views of a second element of the bell crank means.
Fig. 11 is a detail view on a larger scale of the adjustable feeler.
Figures 7, 8:
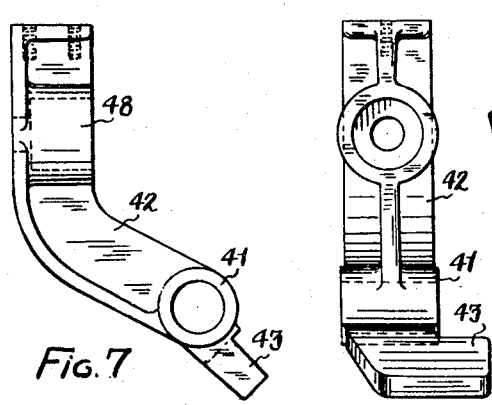
Figs. 7 and 8 are detail elevational views taken at 90° to each other showing one of the elements of a bell crank lever means employed in connection with the invention.

In Fig. 1 a series of paper piles is shown at 10. Mechanism is provided for transferring simultaneously the top sheet of each pile onto the firm upper surface of a conveyor tray or trough 11 extending the length of the machine. A slot 12 extends throughout the length of the conveyor trough, and below this slot there runs a conveyor chain 13 which carries spaced pins 14. After each sheet feeding movement which deposits sheets from all piles onto the conveyor trough, the chain advances one step by means of a one way clutch, not shown, and a sheet or group of sheets opposite each pile is slid along the surface of the trough by a pin to a position opposite the next forward pile. Then another sheet feeding movement occurs followed by a further movement of the conveyor chain etc., the operation continuing so long as the feeding means operates to transfer a single sheet from each pile. Assuming that there are eight stations, as in the case of the machine illustrated in Fig. 1, the final pack at the delivery end of the machine marked P in the drawing should contain eight sheets. The inspection means of the invention is disposed to act upon this final pack directly after the last sheet is deposited upon it. When the test is completed upon a pack of correct thickness the chain moves forward another step and the pack P is carried forward and deposited upon a delivery table or chute 15.

Now referring to Fig. 3, the frame 9 of the machine opposite the pack P carries two sensitive switches, such as microswitches, indicated at 16 and 17, having spring pressed operating plungers 18 and 19 and a double pole switch 20 having a plunger 21. A shaft 23 journaled in the machine frame is driven by a motor, not shown, to have one complete rotation for each machine cycle. This shaft carries a box cam 24. A bell crank lever 25 pivoted at 26 carries a roller follower 27 which runs in the cam groove. The other arm of the bell crank is pivotally connected with the lower end of a reciprocating rod 28. Near the upper end of this rod there is a ball 29 having a diametrical bore to receive the rod. The ball is urged toward an abutment nut 98 by a coil spring 30, the tension of which is adjustable as indicated in the drawing. The upper end of rod 28 has secured thereto a laterally extending finger 31 which is adapted to take under a post 32 vertically slidable in a guide formed in the frame, the post 32 when raised contacting plunger 21 of switch 20 which is a normally closed switch that is open for a small portion of each cycle when the rod 28 is raised. Plunger 32 moves to operative or switch opening position after plungers 18 and 19 move to their operative position, and it recedes before plungers 18 and 19 recede. Finger 31 is adjustable by means of nuts 96 and 97 threadably mounted on the rod 28 on opposite sides of the finger.

Ball 29 has a universal mountig in a socket 34 of spherical contour which is carried by a ring 35 projecting from an arm 36 that has a hub 37 which is rotatably mounted upon a fixed shaft or trunnion 38 supported by the frame of the machine. A ledge or abutment 39 constitutes an integral part of this element.

Rotatably mounted on the same fixed shaft 38 alongside hub 37 is the hub 41 of another element of the said bell crank lever means, which comprises a bracket arm 42 and a ledge or abutment 43. The two abutments 39 and 43 overlap and come together as the rod 28 approaches the upper limit of its travel, so that the final movement of arm 36 toward testing position is communicated to bracket arm 42.

In a threaded socket in the extremity of arm 36 there is mounted a stud 45 having a rubber insert 46 in its head. This stud constitutes the feeler which is lowered onto and caused to depress each pack P, forcing out any air separating the sheets of the pack and accurately measuring the thickness of the pack. The feeler 45 is adjusted by threading it into or out of the socket and is held in adjusted position by a lock nut 47 threadably mounted on the stud. Bracket arm 42 has a cylindrical boss 48 and a hole 49 through the arm in axial alignment with the boss. The head of a bolt 50 bears through a washer 51 against the outer side of bracket arm 42, the shank of the bolt extending through hole 49 and carrying a coil spring 52 within the hollow boss. A washer 53 engages one end of spring 52 and may be adjusted along the bolt by means of a nut 54. Obviously when the bracket arm 42 swings clockwise and causes nut 54 to strike against the plate 55, forming the frame cover for the microswitches, the spring will be compressed and will function to return the bracket arm counterclockwise to its normal position.

The bracket arm 42 has a ledge 57 at its upper end upon which is bolted a small casting 58 having a transverse recess 59 dividing the upper portion of the casting into two parts 60 and 61. 62 and 63 are differential screws identical in form, each having a large diameter portion threaded through a tapped hole in part 60 and a small diameter portion oppositely threaded into slides 64 and 65 respectively which are adapted to move forward or backward in part 61. The slides, which are hereinafter termed abutments, are held from turning by pins 66 extending into longitudinal keyways 67 in the slides. Turning one of these screws through a given angle advances or retracts it in the part 60 of the casting. The smaller oppositely threaded part of the screw tends to move the slide or abutment in a direction opposite that in which the larger part moves it, but to a decreased extent. The resulting movement of the slide for a given rotation of the screw is therefore relatively small, and very fine adjustments may be effected.

The microswitch 16 is a normally open switch, while switch 17 is normally closed. Abutment 64 is adjusted somewhat forward of abutment 65, so that abutment 64 may strike and close switch 16 without abutment 65 striking switch 17, that switch thereby remaining closed. This is the normal operation when the pack is of correct thickness. When the pack is too thick neither abutment 64 nor 64 strikes its plunger and the switches are not affected, one remaining open and the other closed. When the pack is too thin both abutments contact and operate the switches, whereby the normally open switch closes and the normally closed switch opens.

In Fig. 4 we have shown a large scale detail of the cam 24 which operates the testing mechanism. The cam is so designed as to cause the feeler 45 to approach its testing position rapidly and then to descend at a relatively slow rate for its final movement so as to avoid anything resembling a hammer blow which would result in a bouncing action. The major part of the groove is circular as indicated at 70, causing feeler 45 to be raised through about 270° of each cycle. The descent of the cam is rapid through about 30° of angle, as indicated at 71 and then quite slowly for about 15°, as indicated at 72. The ascent of the cam begins slowly from the position of the follower 27 shown in Fig. 4 during the 15° marked 73, after which a rapid ascent to the circular part of the groove takes place during the 30° angle marked 74. The inertia of the feeler 45 as it travels toward the pack during the sharp portion 71 of the cam track is largely absorbed as the follower moves along the relatively flat portion 72 of the track, and consequently the feeler in its final movement descends gradually and smoothly.

Referring to the wiring diagram, line wires are shown at L1 and L2. A motor M is connected in a bridge across these line wires which contains also automatically operated switches 95, 95' and 75, 75'. S and S1 are signal lamps. Start and stop buttons are shown at 76 and 77. 78 and 79 are holding switches for the relays R, R1.

When the machine is to be started the operator presses upon the starter button 76, which establishes a circuit through conductor 80, switch 76, conductors 81, 82 and 83, relay R and conductor 84 to line wire L2. At the same time another circuit is established through conductor 80, switch 76, conductors 85 and 86, conductor 87, relay R1 and conductor 88 to line wire L2. Also the signal lamps S and S1 are illuminated through conductors 81, 89 and 88 on the one hand and through conductors 87, 90, 91 and 88 on the other.

The closing of starting switch 76 energizes relays R and R1 which closes the automatically operated switches 95, 95', 75, 75', starting the motor. At the same time the signal lamps S and S1 are energized. Both of the switches 78 and 79 are closed under the influence of relays R and R1. Consequently the operator may release starting button 76 without deenergizing the relays, one of the circuits running from the line wire L1 through the normally closed stop button 77, normally closed pole 20' of double pole switch 20 in conductor 92, switch 78, conductor 83, relay R and conductor 84 to line wire L2, and the other running from line wire L1 through conductor 93, normally closed pole 20" of double pole switch 20, holding switch 79, conductor 87, relay R1 and conductor 88 to line wire L2. Then, when the feeler 45 comes down on the pile, bracket arm 42 swings clockwise to a slight extent closing switch 16 and leaving switch 17 unaffected. Thereafter finger 31 and post 32 open double pole switch 20', 20". Consequently the energization of relays R and R1 becomes dependent solely upon the switches 16 and 17. Both of these latter switches being closed at the testing instant, current through the motor is maintained until the double pole switch 20', 20" again closes.

Now if the pack being tested contains one sheet less than the correct number, the pack will be too thin and the swinging bracket will advance further than normal, whereupon both of the switches 16 and 17 will be operated, switch 16 closing and switch 17 opening. The opening of switch 17 will deenergize relay R1, opening switch 79 and switches 75, 75'. This will extinguish lamp S1 and stop the motor. If on the other hand the pack contains one more than the correct number of sheets, the pack will be too thick. Consequently the swinging bracket 42 will move less than the normal amount and neither of the switches 16, 17 will be affected. Consequently the open switch 16 will cause relay R to be deenergized, which will open switch 78 controlling lamp S and switches 95, 95' in the motor circuit. When the incorrect pack is removed from the final station of the machine starter button 76 may be depressed and the machine will resume operation.

When the number of sheets to make up a pack is changed or when sheets of thicker or thinner stock are to be collated, the proper thickness of the pack of course changes, and it is then necessary to adjust feeler 45 so as to properly press upon a correct pack. Adjustment of screws 62 and 63 may also be necessary when there is a change of stock in the sheets being handled.

In the illustrated embodiment a pack of incorrect thickness will cause the motor to stop and will cut out one of the lamps S or S1 to show whether the tested pack is under or over correct thickness. It will be apparent however that a single audible or visual signal could be used which would be unaffected provided both of the switches 16 and 17 were maintained closed at the moment of testing.

Having thus described our invention, we claim:

1. Mechanism for testing the thickness of material to be measured, comprising a pair of sensitive switches one of which is normally closed and the other normally open, an inspection bracket, a pair of abutments mounted on said bracket each adapted to contact and operate one of said switches, means for moving said bracket toward and away from said switches once for each machine cycle, the forwardmost or testing position of said bracket being controlled by the thickness of the material to be tested, said abutments being adjusted to open the normally closed switch and close the normally open switch when the bracket travels beyond a predetermined position, to close the normally open switch and leave the normally closed switch unaffected when the bracket travels to and stops at said predetermined position, and to leave both switches unaffected when the bracket stops short of said predetermined position, a translating device the deenergization of which indicates an incorrect thickness of material, a normally closed circuit therefor, and control means in said circuit requiring that both switches be closed at the moment said bracket reaches its forwardmost position in order to maintain said circuit closed and said translating device energized.

2. Mechanism for testing the thickness of material to be measured, comprising a pair of sensitive switches one of which is normally closed and the other normally open, an inspection bracket, a pair of abutments mounted side by side thereon each adapted to contact and operate one of said switches, means for moving said bracket toward and away from said switches once for each machine cycle, the forwardmost testing position of said bracket being controlled by the thickness of the material to be tested, the abutment opposite said normally open switch being slightly advanced relative to the abutment opposite said normally closed switch, a measuring feeler associated with said bracket adapted to contact the material for testing the thickness thereof, said feeler when the material is too thick leaving both switches unaffected, said feeler when the material is of correct thickness causing said normally open switch to close and leaving said normally closed switch unaffected, and said feeler when the material is too thin causing the normally closed switch to open and the normally open switch to close, a translating device the deenergization of which indicates an incorrect thickness of material, a normally closed circuit therefor adapted to energize said translating device, and control means for said circuit requiring that both switches be closed at the moment of testing in order to maintain said circuit closed.

3. In a collator, a frame, a firm pack supporting surface thereon, mechanism for testing the thickness of a pack of sheets on said surface, comprising bell crank lever means, a feeler on one arm of said bell crank lever means adapted to descend upon and engage the pack of sheets to be tested, a pair of switches, a pair of parallel abutments for contacting and operating said switches, one of said pairs being mounted on the frame and the other on the second arm of said bell crank lever means, means for oscillating said bell crank lever means through a predetermined arc to cause said feeler to approach and press upon the pack for thickness testing and then to recede, one of said switches being normally closed and the other normally open, the normally open switch being closed by the corresponding abutment when the pack is of correct thickness or less than correct thickness and remaining open when the pack is too thick, and the normally closed switch remaining closed when the pack is of correct thickness or more than correct thickness and being opened by its abutment when the pack is too thin, a translating device the deenergization of which indicates an incorrect thickness of material, a circuit therefor, and means dependent upon the simultaneously closed condition of both switches at the time the said feeler is on the pack for maintaining said circuit closed.

4. Mechanism for testing the thickness of a pack of sheets, comprising a pair of microswitches one of which is normally closed and the other normally open, an inspection bracket, a pair of abutments mounted on said bracket adapted to contact and operate said switches, means comprising an electric motor for driving said mechanism and oscillating said bracket toward and away from said switches, the forwardmost or testing position of said bracket being controlled by the thickness of the material to be tested said abutments being adjusted to open the normally closed switch and close the normally open switch at testing position when the pack is too thin and to close said normally open switch and leave the normally closed switch unaffected when the pack is of correct thickness, and said abutments when so adjusted being adapted to leave both switches unaffected when the pack is too thick, a motor circuit, and control means for the motor circuit requiring that both switches be closed at the moment of testing in order to maintain the motor circuit closed.

5. Mechanism for testing the thickness of a pack of sheets, comprising a pair of microswitches one of which is normally closed and the other normally open, an inspection bracket, a pair of abutments mounted side by side thereon each adapted to contact one of said switches, means comprising an electric motor for driving said mechanism and oscillating said bracket toward and away from said switches, the abutment opposite said normally open switch being slightly advanced relative to the abutment opposite said normally closed switch, a measuring feeler associated with said bracket adapted to contact the pack for testing the thickness thereof, said feeler when the pack is too thick leaving both switches unaffected, said feeler when the pack is of correct thickness causing said normally open switch to close and leaving said normally closed switch unaffected, and said feeler when the pack is too thin causing the normally closed switch to open and the normally open switch to close, a motor circuit, and control means for the motor circuit requiring that both switches be closed at the moment of testing in order to maintain said motor circuit closed.

6. In a collator, a frame, a firm pack supporting surface thereon, mechanism for testing the thickness of a pack of sheets on said surface, comprising bell crank lever means, a feeler on one arm of said bell crank lever means adapted to descend upon and engage the pack of sheets to be tested, a pair of switches, a pair of parallel abutments for operating said switches, one of said pairs being mounted on the frame and the other on the second arm of said bell crank lever means, means comprising an electric motor for driving said mechanism and oscillating said bell crank lever means through a predetermined arc to cause said feeler to approach and press upon the pack for thickness testing and then to recede, one of said switches being normally closed and the other normally open, the normally open switch being closed by the corresponding abutment when the pack is of correct thickness or less than correct thickness and remaining open when the pack is too thick, and the normally closed switch remaining closed when the pack is of correct thickness or more than correct thickness and being opened by its abutment when the pack is too thin, a motor circuit, means for maintaining said motor circuit closed when the feeler is off the pack, and means dependent upon the simultaneous closed condition of both switches at the time the said feeler is on the pack for maintaining the motor circuit closed.

7. A collator as defined in claim 6, wherein said means for oscillating said bell crank means moves rapidly toward a position short of testing position, and thereafter completes said motion at a slower rate of speed.

8. A collator as defined in claim 6, wherein said bell crank lever means is formed in two arms mounted to turn independently about a common axis, one arm carrying said feeler and the other arm carrying one of said pairs, said means for oscillating said bell crank lever means being connected with the feeler carrying arm, said arms having abutments adapted to engage each other when the feeler approaches the testing position and to communicate motion to the pair carrying arm, whereby the oscillating means functions to swing said pair through a relatively small angle as compared with that of said feeler.

9. A collator as defined in claim 6, wherein said means for oscillating said bell crank lever means operates rapidly to carry said feeler to a position short of testing position, and at a slower rate to complete the final movement to testing position.

10. In a collator, a frame, a firm pack supporting surface thereon, mechanism for testing the thickness of a pack of sheets on said surface, comprising bell crank lever means, a feeler on one arm of said bell crank lever means adapted to descend upon and engage the pack of sheets to be tested, a pair of switches mounted on the frame, one being normally closed, and the other normally open, a pair of abutments carried side by side on the other arm of said bell crank lever means, means comprising an electric motor for driving said mechanism and oscillating said bell crank lever means through a predetermined arc to cause said feeler to approach and press upon the pack for thickness testing and then to recede, the normally open switch being closed by its abutment when the feeler is in testing position and the pack is of correct thickness or less than correct thickness and remaining open when the pack is too thick, and the normally closed switch remaining closed when the pack is of correct thickness or more than correct thickness and being opened by its abutment when the pack is too thin, a motor circuit, means for maintaining said circuit closed when the feeler is off the pack, and means dependent upon the simultaneous closed condition of both switches at the time the said feeler is in testing position for maintaining the motor circuit closed.

11. In a machine of the character described, a frame, a pair of microswitches the first of which is normally closed and the second normally open, a third normally closed switch, a feeler adapted to approach and press upon the pack to be tested, a swinging element mechanically associated with said feeler, abutments on said swinging element adapted to contact and operate said first and second switches individually, the abutment opposite said first or normally open switch being advanced somewhat ahead of that opposite said second or normally closed switch, a reciprocating rod, spring means surrounding said rod, said rod functioning through said spring for causing said swinging element to move to testing position, and means carried directly by the rod for opening said third switch after the feeler on its down stroke has reached final testing position and for closing said third switch before the feeler on its up stroke leaves testing position, a normally energized translating device the deenergization of which indicates an incorrect thickness of material, and control means dependent upon the closed condition of both of said first and second switches for maintaining said translating device energized at the moment of testing.

12. Mechanism for testing the thickness of material to be measured, comprising a pair of sensitive switches one of which is normally closed and the other normally open, an inspection bracket, a pair of abutments mounted on said bracket each adapted to contact and operate one of said switches, means for moving said bracket on the one hand and said switches on the other hand relatively toward and away from each other, once for each machine cycle, the forwardmost relative position being controlled by the thickness of the material to be tested, the relative positions of said bracket and switches being adjusted to open the normally closed switch and close the normally open switch when the bracket and switches approach closer than a predetermined relative position, to close the normally open switch and leave the normally closed switch unaffected when the bracket and switches approach and stop at said predetermined relative position, and to leave both switches unaffected when the bracket and switches stop short of said predetermined relative position, a translating device the deenergization of which indicates an incorrect thickness of material, a normally closed circuit therefor, a control means in said circuit requiring that both switches be closed at the moment said bracket and switches reach their forwardmost relative position in order to maintain said circuit closed and said translating device energized.

References Cited in the file of this patent

UNITED STATES PATENTS

| | | |
|---|---|---|
| 1,738,180 | Frazier | Dec. 3, 1929 |
| 2,145,520 | McFarlane | Jan. 31, 1939 |